US008882579B2

(12) United States Patent
Green et al.

(10) Patent No.: US 8,882,579 B2
(45) **Date of Patent: *Nov. 11, 2014**

(54) GAMING SYSTEM HAVING GAMING MACHINES WITH PROJECTED OR POLARIZED IMAGE REEL SYMBOLS

(75) Inventors: Anthony E. Green, Henderson, NV (US); Anand Singh, Henderson, NV (US); Thomas E. Buckeyne, N. Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,037

(22) Filed: Aug. 6, 2012

(65) Prior Publication Data

US 2012/0302318 A1 Nov. 29, 2012

Related U.S. Application Data

(63) Continuation of application No. 12/271,806, filed on Nov. 14, 2008, now Pat. No. 8,235,794.

(51) Int. Cl.
*A63F 9/24* (2006.01)
*A63F 13/00* (2014.01)
*G07F 17/32* (2006.01)

(52) U.S. Cl.
CPC .................................. *G07F 17/3211* (2013.01)
USPC ............... 463/20; 463/30; 463/43; 273/157 R

(58) Field of Classification Search
None
See application file for complete search history.

(56) References Cited

U.S. PATENT DOCUMENTS

| | | | | |
|---|---|---|---|---|
| 5,717,522 | A | 2/1998 | Hattori | |
| 7,452,276 | B2 * | 11/2008 | Loose et al. | 463/31 |
| 7,744,460 | B2 * | 6/2010 | Walker et al. | 463/21 |
| 8,235,794 | B2 * | 8/2012 | Green et al. | 463/20 |
| 8,235,795 | B2 * | 8/2012 | Green et al. | 463/20 |
| 8,408,998 | B2 * | 4/2013 | Rasmussen et al. | 463/31 |
| 8,439,741 | B2 * | 5/2013 | Loose et al. | 463/20 |
| 8,556,730 | B2 * | 10/2013 | Jo | 463/46 |
| 2003/0017856 | A1 | 1/2003 | Kotchick et al. | |
| 2003/0157980 | A1 * | 8/2003 | Loose et al. | 463/20 |
| 2005/0277467 | A1 | 12/2005 | Karabin et al. | |
| 2006/0199638 | A1 * | 9/2006 | Walker et al. | 463/30 |
| 2006/0223632 | A1 | 10/2006 | Walker et al. | |
| 2008/0039181 | A1 * | 2/2008 | Loose et al. | 463/20 |
| 2008/0039182 | A1 * | 2/2008 | Loose et al. | 463/20 |
| 2008/0096655 | A1 * | 4/2008 | Rasmussen et al. | 463/31 |

(Continued)

FOREIGN PATENT DOCUMENTS

| | | | | |
|---|---|---|---|---|
| JP | 2004-166853 | * 6/2004 | A63F 7/02 |
| JP | 2007-268173 | * 10/2007 | A63F 7/02 |

*Primary Examiner* — Seng H Lim

(74) *Attorney, Agent, or Firm* — Brooke Quist; Marvin Hein

(57) ABSTRACT

A system for providing a multi-game gaming machine having mechanical reel strips is displayed. The use of the projection devices onto blank mechanical reel strips transforms the multi-game gaming machine to a mechanical reel video game. These projection devices project the multi-game symbol images over the exposed portions of the mechanical reel strips. The projection devices are to be positioned such that its image projection covers one, two, or three reels of the available viewable area. The multi-game symbol projected images are theme based and can be easily changed or updated. The multi-game gaming machine has access to changing reel strips, and as such a number of sets of symbols can be displayed based on a game selection and corresponding image polarizer orientation.

20 Claims, 10 Drawing Sheets

(56) References Cited

U.S. PATENT DOCUMENTS

| | | | | |
|---|---|---|---|---|
| 2008/0176653 | A1 | 7/2008 | Kishi | |
| 2008/0188293 | A1 | 8/2008 | Rasmussen et al. | |
| 2008/0242401 | A1 | 10/2008 | Jaffe | |
| 2009/0017903 | A1 | 1/2009 | Mizoguchi et al. | |
| 2010/0048280 | A1 | 2/2010 | Kearns et al. | |
| 2010/0123286 | A1* | 5/2010 | Green et al. | 273/143 R |
| 2010/0124972 | A1 | 5/2010 | Rodgers et al. | |
| 2010/0190552 | A1 | 7/2010 | Rasmussen et al. | |
| 2011/0003630 | A1 | 1/2011 | Rasmussen et al. | |
| 2011/0134363 | A1 | 6/2011 | Ikeda | |
| 2011/0136573 | A1 | 6/2011 | McComb et al. | |
| 2011/0157555 | A1* | 6/2011 | Mashitani et al. | 353/7 |
| 2012/0056989 | A1* | 3/2012 | Izumi | 348/46 |

* cited by examiner

GAMING SYSTEM HAVING GAMING MACHINES WITH PROJECTED OR POLARIZED IMAGE REEL SYMBOLS

RELATED APPLICATION

This application is a continuation of U.S. patent application Ser. No. 12/271,806 filed Nov. 14, 2008 entitled Gaming System Having Gaming Machine With Projected Or Polarized Image Reel Symbols, which is related to copending U.S. patent application Ser. No. 12/271,810, filed Nov. 14, 2008, entitled Gaming Method Having Gaming Machine With Projected Or Polarized Reel Symbols, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

Embodiments disclosed herein relate generally to gaming machines providing projected or polarized light symbol images on mechanical reels.

BACKGROUND

Gaming machines have been developed having various features to capture and maintain player interest. Traditionally, gaming machines garner player interest by providing the player with the opportunity to win cash awards based upon a player's wager. Accordingly, various types of games or game features have been developed to provide players with the opportunity to win large sums of money for a small wager. For example, games may include one or more bonus games or the opportunity to win progressive jackpots in order to maintain player interest.

Traditional mechanical gaming machines include three or more reels, with each reel having a set number of symbols spaced apart. One of the limitations of a reel-spinning multi-game gaming machine is that the reel strips are fixed, and a mechanical reel strip cannot have its appearance or the order of the symbols easily changed. Multi-game play is further limited when symbols have to be shared with or selected from the common symbols on the reel strips.

Additionally, over the years, gaming machines have grown in sophistication and features to maintain player interest. For example, the mechanical reels of traditional gaming machines have been replaced with video depictions of spinning reels. Nevertheless, mechanical gaming machines continue to be successful despite the physical limitations as to the features that may be provided on a mechanical gaming machine. Accordingly, there is a continuing need for mechanical slot machine variants that provide a player with enhanced excitement without departing from the original slot machine gaming concept.

SUMMARY

Briefly, and in general terms, various embodiments are directed to gaming machines having polarized images and/or projected images presented on one or more mechanical reels. In one embodiment, a mechanical reel gaming system is capable of playing multiple different games that have different symbol images at the symbol positions on each mechanical reel. The gaming system includes a gaming machine cabinet housing a plurality of mechanical reels, a plurality of back light sources for each mechanical reel, and an image polarizer for each back light source. Each mechanical reel has a mechanical reel strip attached thereto, wherein a polarized material layer is attached to the exterior of each mechanical reel strip, and wherein each symbol position on each mechanical reel contains a composite of multiple symbol images. The image polarizers, the back light sources, and the composite of multiple symbol images at each symbol position produces different symbol images in different orientations of polarized light.

In another embodiment, a mechanical reel gaming system is capable of playing multiple different games that have different symbol images at the symbol positions on each mechanical reel. The gaming system includes: a gaming machine cabinet housing a plurality of mechanical reels and one or more projection devices. Each mechanical reel has a reel strip attached thereto, and each symbol position on each mechanical reel contains a black space at the symbol position. The projection devices project symbol images onto the black space at each symbol position on the reel strips. The projection devices are positioned such that the projected symbol images cover multiple reels of a reel display of the gaming machine.

Other features and advantages will become apparent from the following detailed description, taken in conjunction with the accompanying drawings, which illustrate by way of example, the features of the various embodiments.

DETAILED DESCRIPTION

Figure 1:
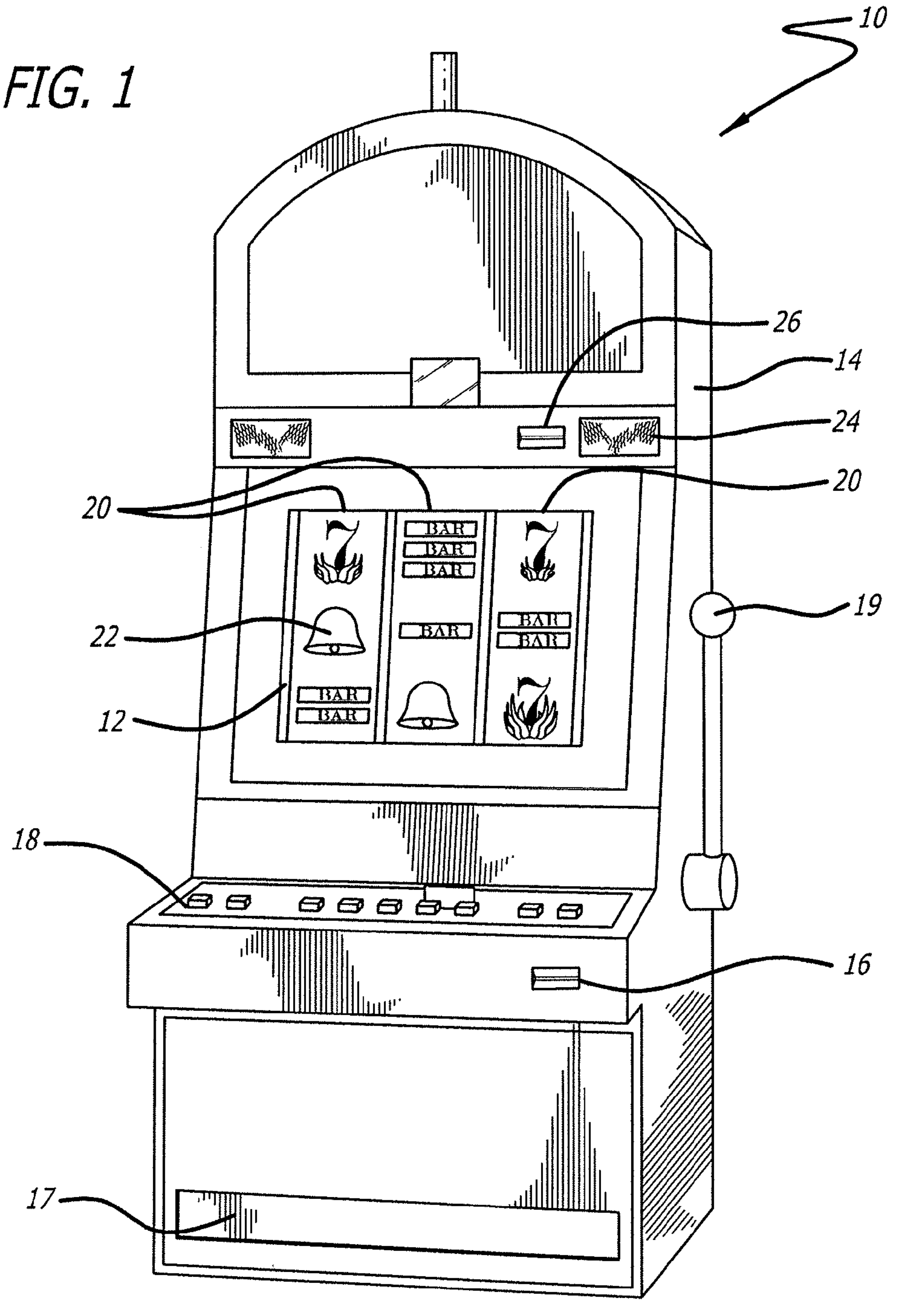
FIG. 1 is a perspective view of one embodiment of a multi-game mechanical reel gaming machine.
Figure 2:
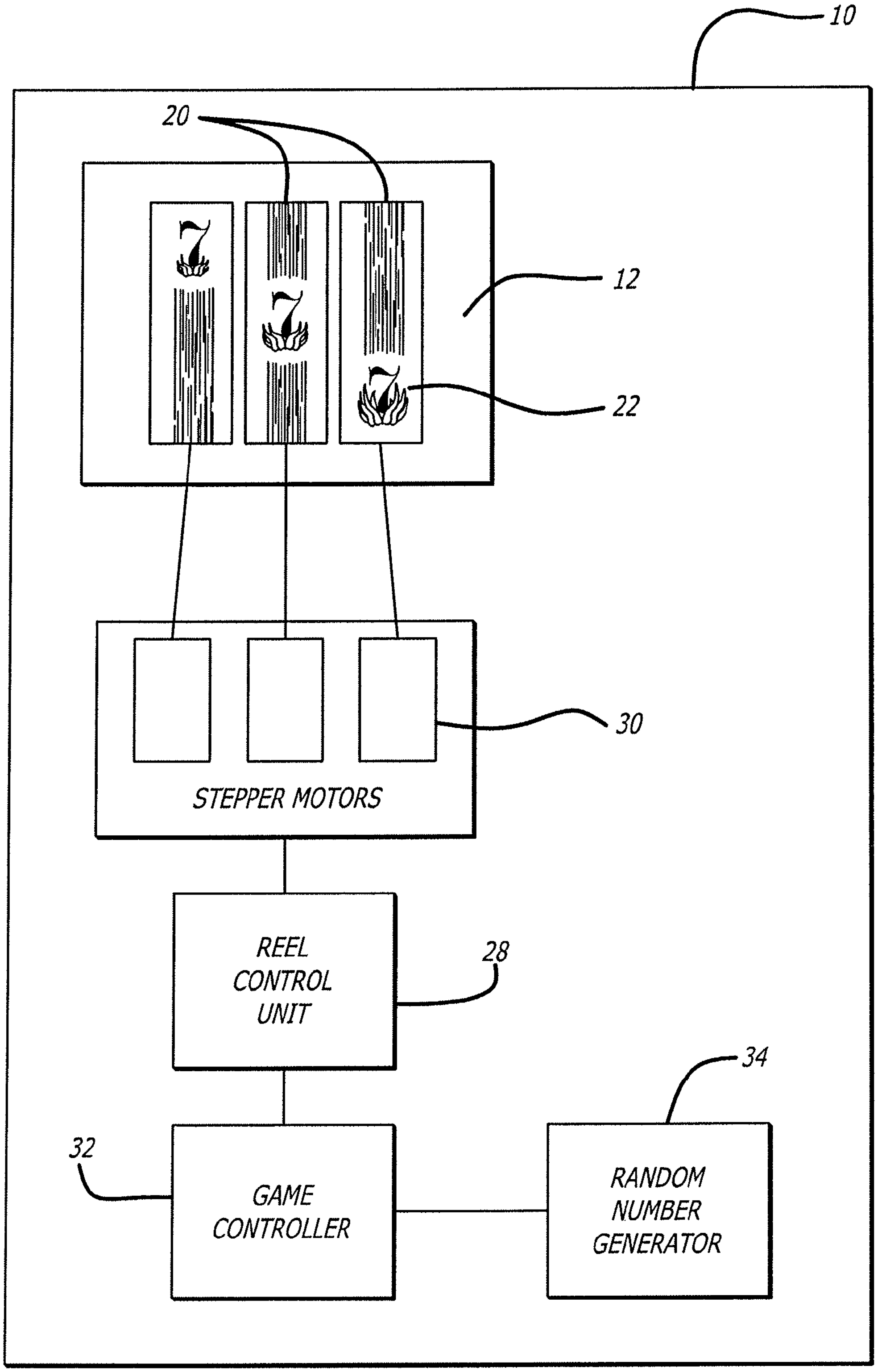
FIG. 2 is a schematic diagram of one embodiment of a mechanical gaming machine.

Referring now to the drawings, wherein like reference numerals denote like or corresponding parts throughout the drawings and, more particularly to FIGS. 1-2, there are shown various embodiments of a system for projected or polarized light symbol images on mechanical reels of a gaming machine. More specifically, as shown in FIGS. 1-4, various embodiments are disclosed that are directed to providing projected or polarized light symbol images on a mechanical or electro-mechanical reel gaming machine. In particular, projected or polarized light are used to simulate the appearance of symbol images on mechanical reel strips in the display area of a gaming machine.

A preferred embodiment of the system providing a multi-game gaming machine having mechanical reel strips is displayed. The use of the projection devices onto blank mechanical reel strips transforms the multi-game gaming machine to a mechanical reel video game. These projection devices project the multi-game symbol images over the exposed portions of the mechanical reel strips. The projection devices are to be positioned such that its image projection covers one, two, or three reels of the available viewable area. The multi-game symbol projected images are theme based and can be easily changed or updated.

Additionally, a mechanical-reel gaming machine may include light responsive polymer material layers on its reel strips having multiple symbol images visible in polarized light and methods for displaying such symbol images is disclosed. The multi-game gaming machine has access to changing reel strips, and as such a number of sets of symbols can be displayed based on a game selection and corresponding image polarizer orientation. Back lights for each mechanical reel are to provide a uniform light source, and enough light coverage for all viewable reel payline positions. The uniform light sources per reel work with the image polarizer associated per reel, with polarizer location preferably between the reel and the game patron or the light sources and the reel. The polarizer orientation changes based on a game selection, with different game symbols displayed according to that selected game.

Referring again to the drawings, wherein like reference numerals denote like or corresponding parts throughout the drawings, and more particularly to FIGS. 1-2, there are shown various embodiments of a system and method for producing projected or polarized light symbol images on a mechanical or electro mechanical gaming machine. Specifically, FIG. 1 illustrates a mechanical gaming machine 10. The gaming machine 10 includes three mechanical reels 20 that are visible through a display window 12. Those skilled in the art will appreciate that the gaming machine 10 may have any number of mechanical reels 20. Additionally, one or more symbols 22 are provided on the outer surface of each mechanical reel 12.

The mechanical reels 20 are housed in a gaming cabinet 14. The main cabinet 14 of the gaming machine 10 is a self-standing unit that is generally rectangular in shape. In other embodiments, the cabinet (not shown) may be a slant-top, bar-top, or table-top style cabinet. However, any shape of cabinet may be used with any embodiment of the gaming machine 10 and sized for a player to be able to sit or stand while playing a game. Additionally, the cabinet 14 may be manufactured with reinforced steel or other rigid materials that are resistant to tampering and vandalism.

The gaming machine 10 includes one or more input mechanisms. In one embodiment, the gaming machine 10 may include a plurality of player-activated buttons 18, which may be used for numerous functions such as, but not limited to, selecting a wager denomination, selecting a number of games to be played, selecting a wager amount per game, initiating a game, or cashing out money from the gaming machine 10. The buttons 18 function as input mechanisms and may include mechanical buttons, electromechanical buttons or touch screen buttons. Optionally, handle 19 may also serve as an input mechanism. More particularly, the handle 19 may be "pulled" by a player to initiate a game.

The gaming machine 10 may also include one or more speakers 24. Various types of audio may be output to the speakers 24. In various embodiments, the gaming machine 10 shown may also include a ticket reader/ticket printer system 16 that is associated with a cashless gaming system. In one embodiment, the ticket reader/ticket printer system may print out and/or issue tickets. In another embodiment, the ticket reader/ticket printer system 16 is capable of accepting previously printed vouchers, paper currency, promotional coupons, or the like. The ticket reader/ticket printer system 16 of the cashless gaming system may generate vouchers having printed information that includes, but is not limited to, the value of the voucher (i.e., cash-out amount) and a barcode that identifies the voucher.

Optionally, in an alternate embodiment, the ticket reader/ticket printer system 16 includes a bill acceptor, which is an assembly that examines currency or coupons and communicates the value to the machine. Accepted items register as credits, and rejected items are returned to the player. In one optional embodiment, the slot 24 works in conjunction with a bill acceptor assembly. Alternately, in an optional embodiment, the gaming machine 10 includes a separate bill acceptor (not shown). In one embodiment, the bill acceptor device may include an embedded web server that delivers a management user interface to a web browser. The management user interface may be used to control and configure various functions and operations of the bill acceptor.

The gaming machine 10 may further include a player tracking system (not shown). The player tracking system allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

Typically, the player tracking system is operatively connected to one or more input components on the gaming machine 10. These input components include, but are not limited to, a card reader 26 for receiving a player tracking card, a keypad or equivalent, an electronic button receptor, a touch screen and the like. The player tracking system may also include a database of all qualified players (i.e., those players who have enrolled in a player rating or point accruing program). Generally, the database for the player tracking system is separate from the gaming devices. The gaming machine 10 includes a card reader 26 that may be used to read player tracking cards. Additionally, the card reader 26 may also read casino employee cards. Each time a card is inserted into the reader, it monitors and tracks player and employee activity.

FIG. 2 is a schematic illustration of a gaming machine 10 configured to provide symbol image sequences on the mechanical gaming machine 10. The mechanical gaming machine 10 includes stepper motors 30, wherein one stepper motor is connected to one reel 20. As those skilled in the art will appreciate, the gaming device 10 may include additional stepper motors 30. Alternatively, in another embodiment, the gaming machine 10 may have fewer stepper motors 30 than reels 20. The gaming device 10 also includes a reel control unit (RCU) 28, and a game controller 32.

As shown in FIG. 2, the reels 20 are operatively coupled to stepper motors 30. The stepper motors 30 are responsible for spinning and stopping the reels 20. Once the reels 20 stop, multiple symbols 22 are visible. Each reel spin is comprised of a specific number of motor steps having a fixed time duration that operates the motor to achieve a fixed angle of rotation. During acceleration of the reels 20, the motor steps generally progress from a long duration to a short duration. When the reels 20 are traveling at their final velocity, all the motor steps are of the same duration. During deceleration, the motor steps generally progress from a short duration to a long duration until the motor comes to a stop.

The stepper motors 30 of the gaming machine 10 are controlled and monitored by the RCU 28. More specifically, the RCU 28 is responsible for determining the spin profile for each reel 20. In order to determine the appropriate spin profile, the RCU 28 calculates the distance between the current and final position of each reel. Based upon the spin distance and the desired spin duration of each reel, the RCU 28 then determines a spin profile for each reel 20.

As shown in FIG. 2, the RCU 28 is in communication with the game controller 32. The game controller 32 is a combination of hardware and software components that supports the game for a gaming machine or a group of gaming machines 10. The game controller 32 is configured to support the game and may be responsible for the various functions of the gaming machine, such as, but not limited to, monitoring coin-in, coin-out, or credit meters, and awarding any prize(s) based upon the game result. The game controller 32 also generates the game outcome (i.e., the final stopping position for each reel) and is responsible for determining the desired spin duration for each reel 20. As those skilled in the art will appreciate, any of these functions may be separated into different or logical units and do not have to exist in a single controller unit. The RCU 28 is also responsible for timing the illumination of the symbols with the reel position.

In one embodiment, the game controller 32 includes a random number generator 34 that determines a game outcome, wherein the game outcome is a combination of indicia. In alternate embodiments, the game controller 32 may use a pseudo-random number generator or a weighted random number generator to determine the game outcome. In yet another embodiment, the random number generator 34 (or pseudo-random number generator or weighted random number generator) is a separate component in communication with the game controller 32.

As shown in FIG. 2, the RCU 28 and the game controller 32 are separate components located within the gaming machine 10. As those skilled in the art will appreciate, the RCU 28 may be interconnected to the game controller 32 by a USB connection, a wireless network connection, or any other means for operatively coupling components together. In an alternate embodiment, the RCU 28 and the game controller 32 are integral components (not shown). In yet another embodiment, the RCU 28 and the game controller 32 may be located within the gaming machine 10, but the functions of the RCU or the game controller may be carried out at a central location (not shown), such as a network server, and communicated to each gaming machine by a local area network, wireless network, wide area network, or the like.

Typically, the player tracking system is operatively connected to one or more input components on the gaming machine 10. These input components include, but are not limited to, a card reader for receiving a player tracking card, a keypad or equivalent, an electronic button receptor, a touch screen and the like. The player tracking system may also include a database of all qualified players (i.e., those players who have enrolled in a player rating or point accruing program). Generally, the database for the player tracking system is separate from the gaming devices.

As noted above, each gaming machine 10 includes a card reader 26 that may be used to read player tracking cards. In one embodiment, the card reader 26 receives player information and the received information affects the symbol images. For example, the system may be configured to trigger the symbol images only for players who have a player tracking card. If a player does not insert a player tracking card into the card reader 26 then no winning symbol images will be presented to the player. Optionally, in an alternate example, the winning symbol images may be presented to players only on special occasions such as birthdays and anniversaries. This information would be obtained from the player tracking card. Further, player activity could be criteria for triggering the winning symbol images. In one example, the winning symbol images may be presented only for high rollers. Again this information would be obtained from the player history.

Optionally, in alternate embodiments, other actions for triggering winning symbol images may include, but are not limited to, a particular number of consecutive wins, a maximum number of bets, time of play, frequency of play (i.e., number of games played in a particular period of time), number of player points earned, a particular time (of day, month, or year), the detection of a particular player, and the like. Additionally, more than one of the above-described actions may be designated as a trigger. Alternately, any combination of the above-described action may be designated as a trigger.

Figure 3:
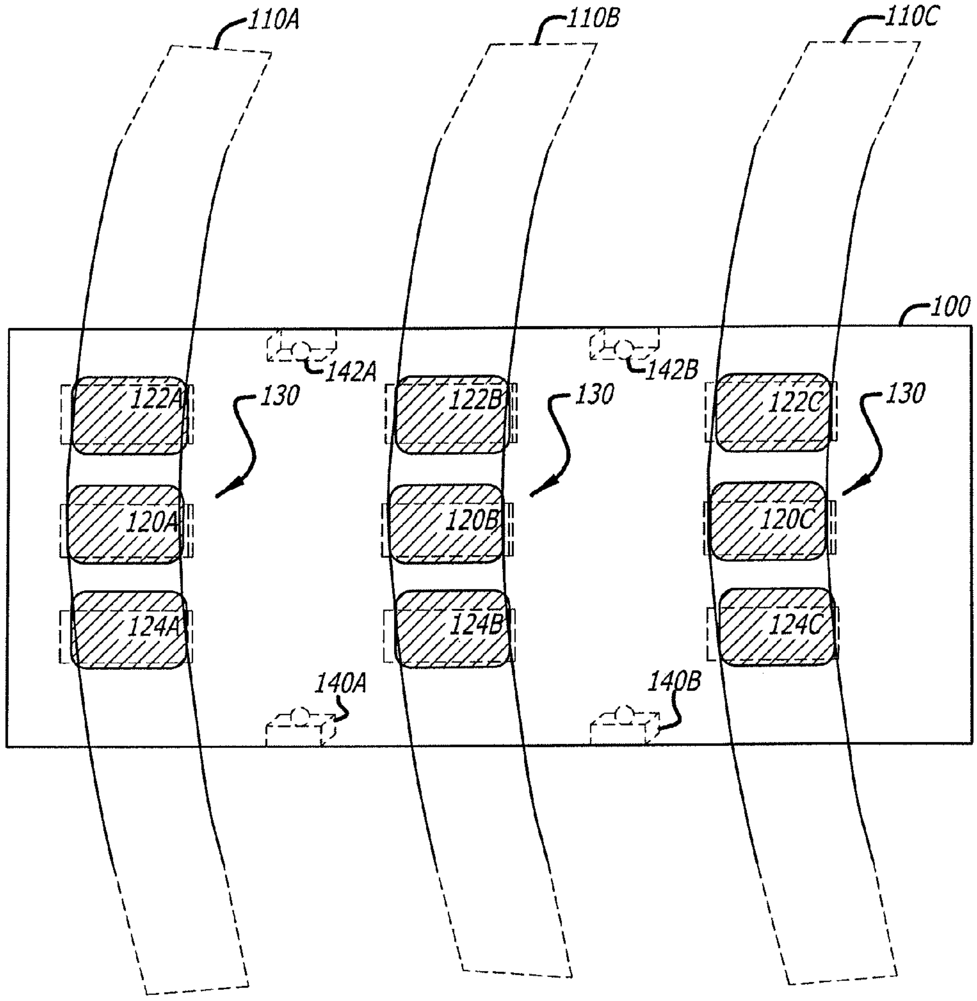
FIG. 3 is a simplified perspective view of a multi-game gaming machine 80 showing its reels, symbols, lights, and projection devices.

Referring now to FIG. 3, a multi-game gaming machine 80 having mechanical reel strips 110A, 110B, and 110C, is displayed. In one embodiment, the multi-game gaming machine 80 includes three blank symbol positions 120, 122, and 124 per blank reel strip 110A, 110B, and 110C with layered material coverage for receiving projected images from fixed projection devices 140 and/or 142. These projection devices 140 and/or 142 project the multi-game symbol images over the exposed portions of the mechanical reel strips 110A, 110B, and 110C. The projection devices 140 and/or 142 are to be positioned such that its image projection covers one, two, or three reels of the available viewable area. The multi-game symbol projected images are theme based and can be easily changed or updated. The use of the projection devices onto blank mechanical reel strips 110A, 110B, and 110C transforms the multi-game gaming machine 80 to a mechanical reel video game.

FIG. 3 illustrates is a simplified perspective view of a multi-game gaming machine 80 showing its reels, symbols, lights, and projection devices. As shown in FIG. 3, a three-reel multi-game gaming machine 80 has a viewable screen 100 that displays portions of the available blank mechanical reels 110A, 110B, and 110C, with each reel covered with a layer of receptive material. The three blank symbol positions 120, 122, and 124 per reel have the existing backlit lights 130 behind each symbol image location. In one embodiment, the projection devices 140 and/or 142 are mounted above or below the three reel symbol image positions, and are pointed toward these symbol positions. The projection devices 140 and/or 142 have proper placement and size to project over all the reels and display onto the three symbol image positions 120, 122, and 124.

In one embodiment, the multi-game gaming machine 80 uses one projection device 140 or 142 to display the three symbol positions 120, 122, and 124 on more than one mechanical reel 110A, 110B, and 110C. The multi-game gaming machine 80 replaces existing gaming machines, which simply have mechanical reel strips with symbols upon them, with blank mechanical reel strips 110 covered with a layered material that allows the projection device(s) 140 and/or 142 to display the symbol images. In one embodiment, the projection device 140 is mounted near to the lower edge of the multi-game gaming machine 80 viewing area 100, facing upward nearly perpendicular to have the symbols projected onto the blank mechanical reel strips 110 when the reels are moving. In another embodiment, another projection device (or an additional projection device) 142 is mounted near to the upper edge of the multi-game gaming machine 80 viewing area 100, facing downwards nearly perpendicular to have the symbols projected onto the blank mechanical reel strips 110 when the reels are moving.

In some embodiments, it does not make a difference if the reel is spinning or the associated three symbol images are changing, for with a video multi-game gaming machine 80 there is the same effect. A video multi-game gaming machine 80 has a spinning reel animated. In one embodiment, the multi-game gaming machine 80 has a spinning mechanical reel 110, and its associated projection device 140 is projecting symbol images synchronized with it. A standard randomness algorithm (e.g., Random Number Generator) that is commonly uses in these types of regulated gaming machines is not affected by the above activities. The frame pickup on the reel stepping to the next frame still exists. The button interface is also not affected.

The multi-game gaming machine 80 enables fixed mechanical reel machines to be converted into multi game machines. In one embodiment, the projected symbol images are theme dependent and, as such, results in multi-game reels. The physical mechanical reels stay the same, but the images projected onto the reels can be updated or changed easily. Then changes to what were typically generic themed mechanical reel symbols may be changed as easily as video game motifs. The projection device 140 is physically small, and is to have an angle of projection with good perception correction, for the projection device 140 is not directly aligned to the three symbol positions 120, 122, and 124 on any reel. To avoid the resulting symbol images projected to suffer from perspective (keystone) distortions, and such then requiring manual optical or digital correction, the projection device 140 is to utilize keystone corrective technology, including for example use of a projector-camera combination. For example, with a game patron selecting one game theme from the multi-game themes available, the projection device 140 changes the symbols it projects to match the selected game theme that are unique to that game. The selection remains unchanged until a new game theme is chosen by the game patron. With a subsequent change to another game, at that game selection moment the projection device 140 projects new symbols associated with the newly selected game. In such an embodiment, the prior game symbols are no longer visible.

However, for most multi-game gaming machine 80 games, the game patron plays in front of the multi-game gaming machine 80 within a 120 degree view, which is the arc of viewing from the left edge of the multi-game gaming machine 80 to its right edge, covering all the gaming display in between. Symbol image presentation is distortion free with game patrons viewing within 120 degrees on the blank mechanical reels 110.

In an alternate layout, an alternative or additional projection device 142 is mounted above, near the upper edge of the multi-game gaming machine 80 viewing area 100. The characteristics for the projection device 142 are similar to that of the projection device 140 mounted below. Using two projection devices 140 and 142, both above and below, helps to alleviate the keystone effect. Additionally, using one projection device per reel is also implemented in another embodiment of the multi-game gaming machine 80. In yet another embodiment, a multi-reel, multi-game mechanical gaming system utilizes a ratio of two projection devices per five-reels.

Figure 4:
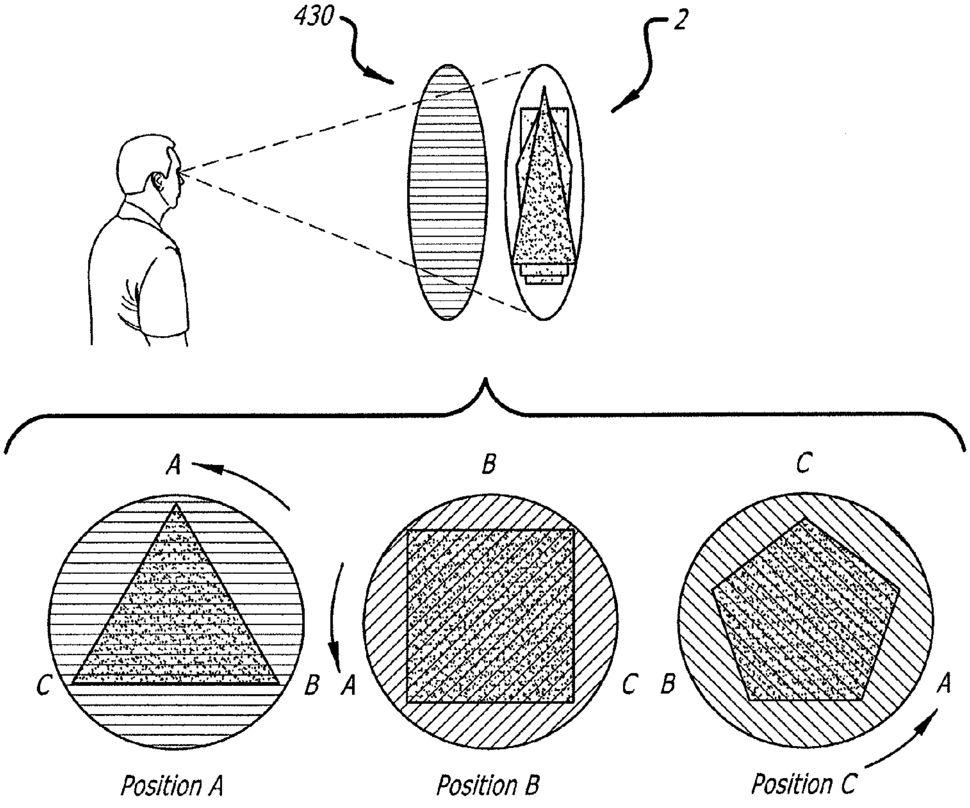
FIG. 4 illustrates the multiple orientation polarized light effect on one position of multiple symbols.
Figure 5:
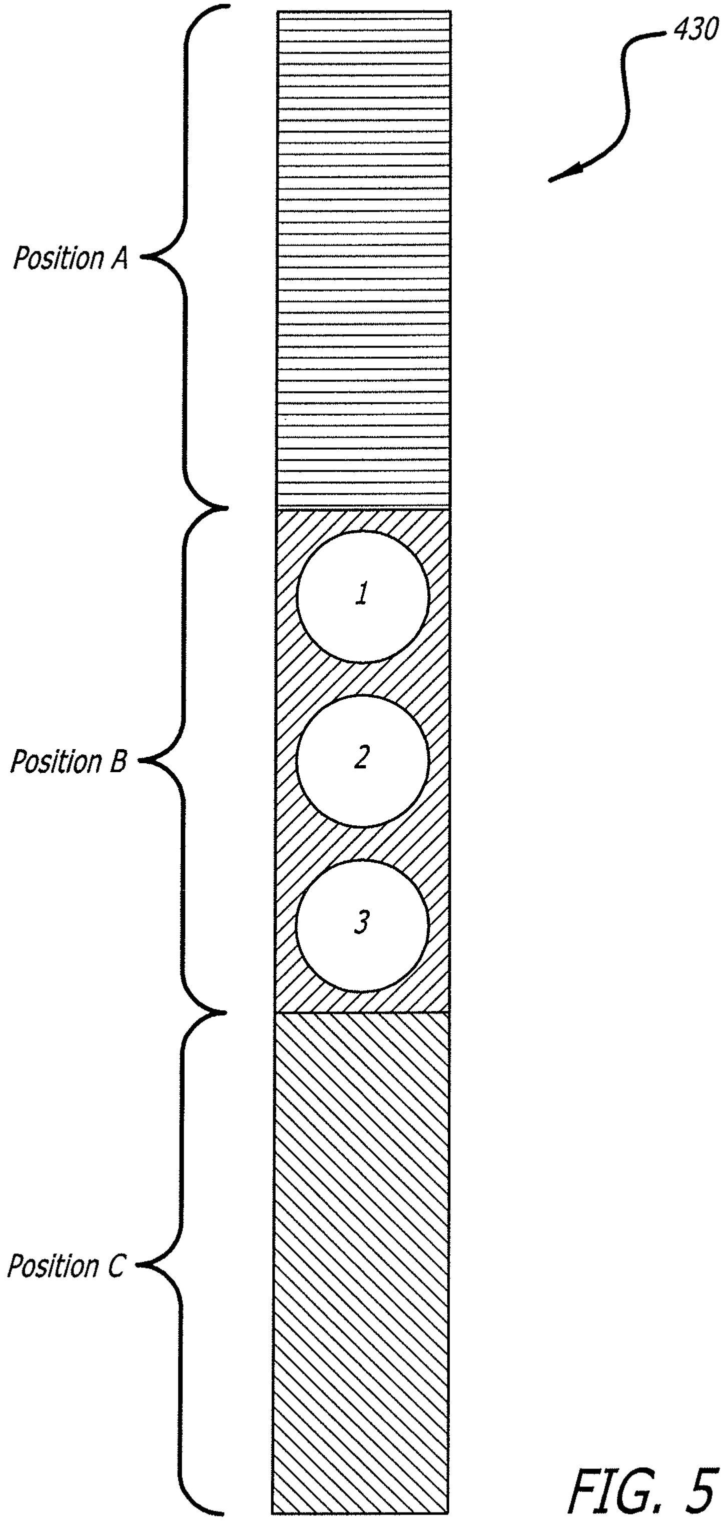
FIG. 5 is a schematic view illustrating the image polarizer with its multiple orientations and its relative position to the reel symbols visible to a viewer.
Figure 6:
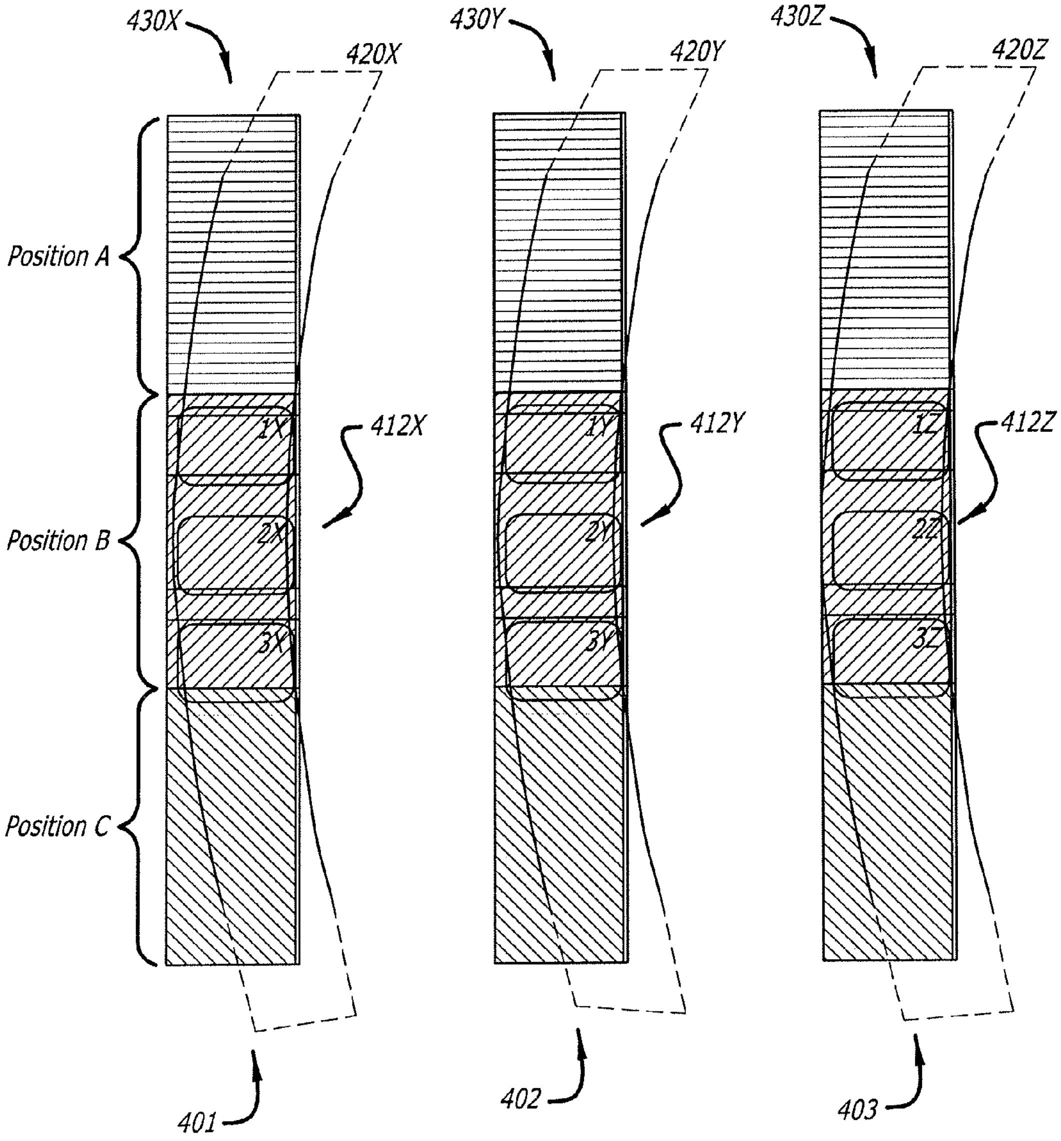
FIG. 6 is a simplified perspective view of a gaming machine with three reels, and the layering of three back lights, symbols, and image polarizer.

In one embodiment shown in FIGS. 4-6, a mechanical reel gaming machine 400 includes light-responsive polymer material layers on its reels 401, 402, and 403 having multiple symbol images visible in polarized light and methods for displaying such symbol images. In this manner, a game patron using a multi-game gaming machine 400 has access to changing reel strips, whereby a number of sets of symbols can be displayed based on a game selection and corresponding image polarizer orientation (via image polarizer 430X). Back lights 412X, 412Y, and 412Z for each mechanical reel 401, 402, and 403 provide a uniform light source, and enough light coverage for all viewable reel payline positions. The uniform light sources 412X, 412Y, and 412Z work with the image polarizer associated with each reel. The polarizer location is preferably between the reel and the game patron or the light sources and the reel. The polarizer orientation changes based on a game selection, with different game symbols displayed according to that selected game. Other applications include wildcards appearing in winning combinations, and then polarizer orientation changes display to equivalent winning symbols. Every physical location on a gaming machine mechanical reel can have polarized light display different and/or unique symbols based on selection criteria.

Typically, a limitation of a tradition mechanical reel spinning gaming machine is that the reel strips are fixed regarding the symbol order and the symbols displayed. A mechanical reel gaming machine can have multiple games, but only with use of mechanical reel strips having common symbols. However, as shown in FIGS. 4-6, the mechanical reel gaming machine 400 includes light-responsive polymer material layers on its reels 401, 402, and 403 having multiple symbol images visible in polarized light and methods for displaying such symbol images. In this regard, each viewable symbol position on the mechanical reel strip able to display a different image related to a selected multi game, based on response to different orientation of uniform polarized light.

FIG. 4 illustrates the effects of different orientation of polarized light on one position of multiple symbols. As shown in FIG. 4, a viewable symbol position composite 2 of several different images is created using layered polarized material on the gaming machine reel. In one embodiment an image polarizer 430 is used with a number of different orientations equal to the number of different images in the viewable symbol position composite 2. The image polarizer 430 is preferably positioned in the gaming machine between the viewable symbol position composite 2 and a game patron playing the gaming machine. Uniform white light is projected outward from the gaming machine toward the game patron, passes through the mechanical reel, and is viewable at symbol position composite 2 and corresponding image polarizer 430.

Referring again to FIG. 4, when the image polarizer 430X is oriented in one position, it produces outbound polarized light as shown in the Position A, displaying an image of a triangle viewable by the game patron. By changing the orientation direction of the image polarizer 430X, through rotation of the polarizer of a number of degrees, it produces polarized light as shown in Position B, displaying an image of a square. A third orientation of the image polarizer 430X produces polarized light as shown in Position C, which displays an image of a pentagon. In this manner, the above-described method provides multiple symbols for each one physical symbol location on a mechanical gaming machine reel. The method changes the symbols' appearances that are on the mechanical reel strips by combined use of polarized light and polarized plastic technology.

The mechanical reel gaming machine 400 with multi-position image polarizers 430X, 430Y, and 430Z enable changes to fixed mechanical reel symbols for multiple games. Such a multi-game gaming machine with changing reel strips enables instantaneous changes to the game theme. When a game patron chooses one game as opposed to another, the reel strips are able to immediately change in appearance to the new selection. This selection remains unchanged until the game patron selects a new game theme. For example, in one non-limiting embodiment a multi-game gaming machine has three games A, B and C, and these three games use the same physical mechanical reel strips. A fixed number of symbols are associated with each of the games A, B, and C. With selection of game A, the image polarizers 430 have their orientation rotated such that the resulting symbols displayed are unique to the game A. With a subsequent change to another game, such as game B, at that game selection moment the image polarizers 430 have their orientation shifted so only the game B symbols appear. The symbols of game A are no longer visible.

Referring now to FIG. 5, a schematic view is shown that illustrates the image polarizer with its multiple orientations and its relative position to the reel symbols visible to a viewer. Specifically, FIG. 5 shows an embodiment of a mechanical reel gaming machine 400 with three-position image polarizers 430, image polarizer 430X for reel 401, image polarizer 430Y for reel 402, and image polarizer 430Z for reel 402. The positioning of the image polarizers 430 relative to the above three fixed symbol positions 1, 2, and 3 on a mechanical reel strip is clearly visible to a game patron. Positions A, B, and C together comprise the image polarizers 430, connected together in strip-like fashion, with Position A in the uppermost location, Position B in the center, and Position C in the lower location. With a multiple game option selected on the gaming machine 400, the image polarizer strip shifts into the Position A, B, and C based on the orientation matching to the selected multi game option. Monitoring of the image polarizers 430 is to be performed constantly. If any error is found, including strip alignment or image composite integrity, then a tilt is reported.

Referring now to FIG. 6, a simplified perspective view of a gaming machine 400 is shown with three reels, as well as the layering of three back lights, symbols, and image polarizers 430. The gaming machine 400 includes (1) the most interior layer consisting of the three back light sources 412X, 412Y, and 412Z, with each back light source 412 associated and behind one each of the fixed symbol positions 1, 2, and 3; (2) a second layer consisting of the mechanical reel 420 with positions 1, 2, and 3; and (3) the third and most exterior layer consisting of the image polarizers 430. As displayed in FIG. 6, the gaming machine 400 has three reels 401, 402, and 403, with reel 401 having as its innermost layer the back light source 412X. The next layer above this is the mechanical reel 420X, which has corresponding viewable positions 1X, 2X, and 3X. The third and outermost layer is the image polarizer 430X, with the Position B oriented in front of the three symbols, and their corresponding lights, visible to the viewer. Reels 402 and 403 are similarly configured, with corresponding letters Y and Z to the layer elements, respectively.

Figure 7:
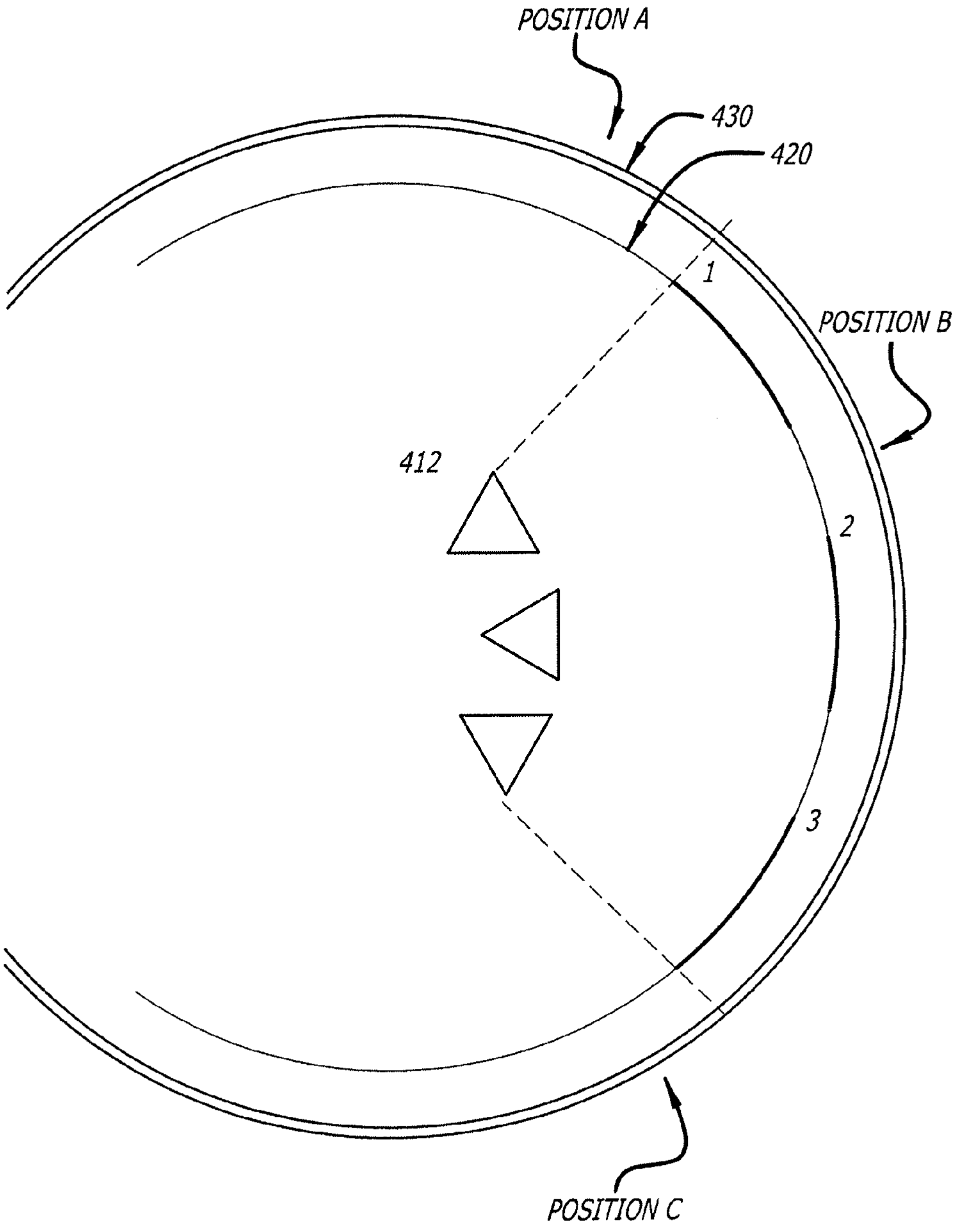
FIG. 7 is a simplified side view of a gaming machine illustrating the three lights, symbols, and image polarizers for the preferred embodiment.

Referring now to FIG. 7, a simplified side view of a gaming machine 400 is shown, illustrating three lights, symbols, and image polarizers 430 in one preferred embodiment. Specifically, FIG. 7 provides a side view of the mechanical reel gaming machine 400 with multi-position image polarizers 430X, 430Y, and 430Z, displaying the three back light sources 412X, 412Y, and 412Z positioned in the innermost layer, with the second layer consisting of the mechanical reel 420, and with positions 1, 2, and 3 inside each of the projected light sources sources 412X, 412Y, and 412Z. In this embodiment, the image polarizers 430X, 430Y, and 430Z are the outer layer with Position B covering the symbols that are visible to a viewer.

In one embodiment, the uniform light source is split among the three different light sources 412X, 412Y, and 412Z. Nevertheless, the three light sources remain synchronized to emit the uniform light over their associated symbol positions 1, 2, and 3. This back light source 412 is uniform, one-color, and shines outward wide enough to cover the three light source positions 1, 2, and 3 visible to a viewer. Additionally, image polarizer Positions A, B, and C of the image polarizers 430X, 430Y, and 430Z are also to be wide enough to cover these same three light source positions 1, 2, and 3 that are visible to a viewer. The back light sources 412X, 412Y, and 412Z are constantly on, and are preferably not turned off. Without a constant light source, or an error in the image polarization process, the symbols requiring the use of the image polarization do not display properly. Accordingly, the light is exists at all times and continuously bathe the polarized symbols.

Additionally, the uniform back light source 412 for each mechanical reel is required to achieve the desired polarizer effect. In this regard, the highlighting effect behind the winning combination symbols in the winning payline can still be performed, provided that the image polarizer strip is positioned between the mechanical reel and the game patron, and the back light source 412 consists of three separate sources, which are consistent with the existing gaming machine backlit structure.

In one embodiment, the mechanical reel gaming machine 400 with three position image polarizers 430 also eliminates a flicker effect when the reels spin. The use of uniform synchronized back light sources 412X, 412Y, and 412Z and associated image polarizers 430X, 430Y, and 430Z for each mechanical reel 420 avoids an unwanted flicker effect. Advantageously, as the mechanical reels spin there is a common orientation of polarized light waves throughout its arc of motion. As the triple symbols sweep through this arc the symbols always have the same appearance as they are bathed in polarized light that is similarly oriented. For example, in one non-limiting embodiment, as the triple symbols spin into the game patron viewing area, the appearance of the symbols is consistent through all phases without any distortion, from the top payline through the first intermediate portion between the top and middle paylines, through the middle payline through the second intermediate portion between the middle and bottom paylines, and then finally through the bottom payline. The image polarizer 430 orients itself to the mechanical reel 420 spinning. This effect is maintained until the polarization effect is changed.

The image polarizer 430 for each mechanical reel is aligned with each of the three back light sources 412 in the same direction such that as a reel spins from its top position to its middle position, and then to its bottom position, the image polarizer 430 is oriented across the entire back light sources 412 to enable viewing of the symbols at these top, middle, and bottom positions in each reel. This alignment additionally synchronizes the viewing of the visible symbols so no distortion is displayed, especially at the "in-between" positions between the top, middle, and bottom reel positions.

In another embodiment of the mechanical reel gaming machine 400 with three position image polarizers 430, a winning combination is displayed that includes a wildcard. In this situation, when one of the polarized symbols displays a wild card, there is allowance for the wildcard symbol to change. The position with the wildcard must cycle through its equivalent symbols, displaying these symbols for shorten periods of time, with this presentation technique flashing the wildcard equivalent symbols, for example a blazing 7, a triple bar, and a cherry. This embodiment provides more entertainment value to the game patron, and also instructions as to what constitutes a winning combination from the available symbols that can be displayed.

Additional embodiments implement these capabilities within game bonus rounds. New bonus features are initiated with a unique use of polarized lighting effects on certain symbols. For example, during play of a stars and stripes and a red, white, and blue game theme, where the symbols during ordinary play are static with the occurrence of a winning combination and entry to play in a bonus feature), certain symbols are changed to highlight the feature play, such as a symbol that changes into a picture of "Uncle Sam" or an American flag. These symbols do not appear in the core game, and as such, the game patron is presented displays of symbols that are unique to a bonus feature within a game.

Figure 8:
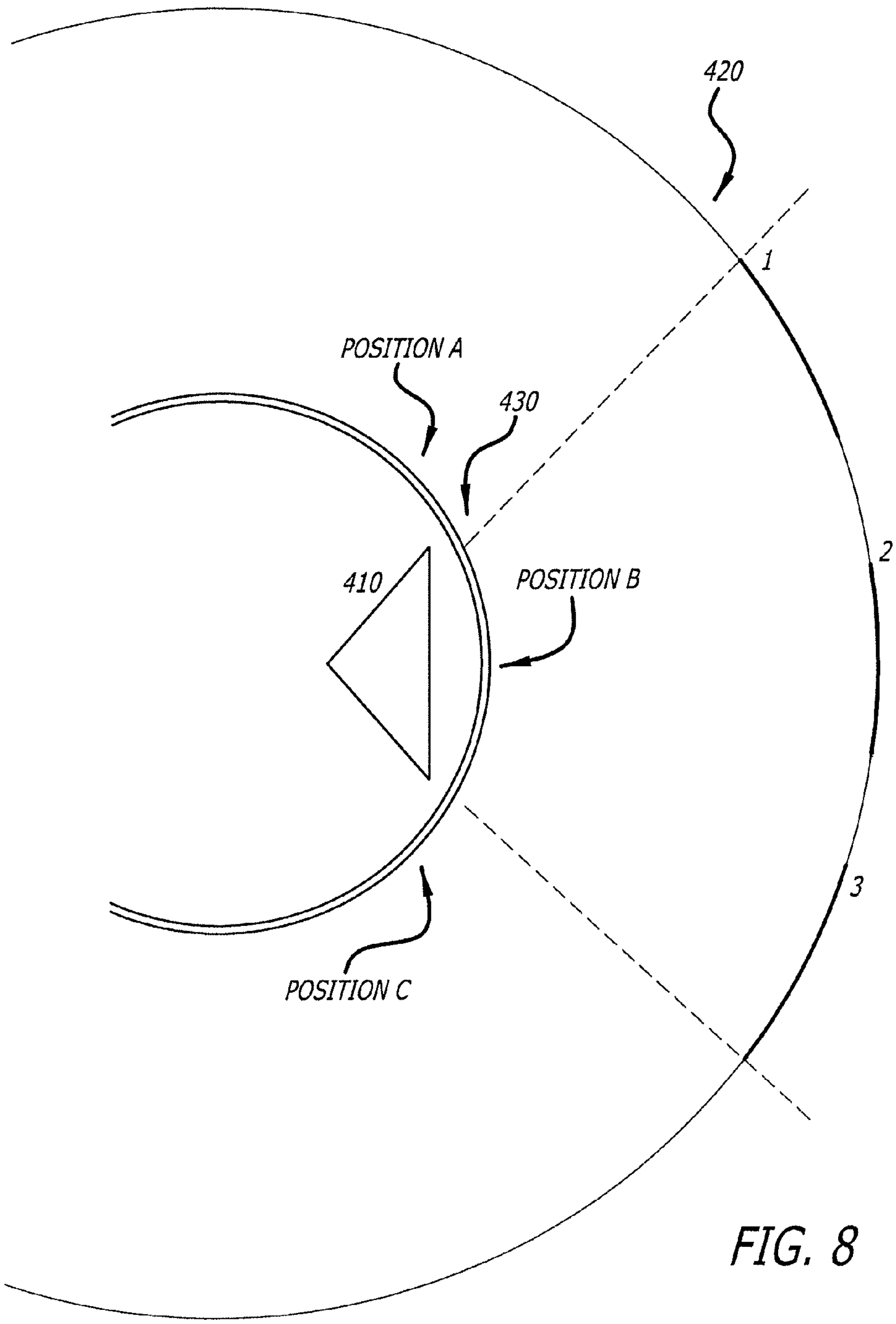
FIG. 8 is a simplified side view of a gaming machine illustrating the one back light, symbols, and image polarizers for an alternative embodiment.

Referring now to FIG. 8, a simplified side view of a mechanical reel gaming machine 400 with three position image polarizers 430 is shown, illustrating one back light, symbols, and an image polarizer for another embodiment. Specifically, FIG. 8 presents an innermost layer with one uniform back light source 410, with the second layer consisting of the image polarizer 430, and with the outer layer consisting of the mechanical reel 420, with positions 1, 2, and 3 inside the arc of light projected from the one back light source 410. The orientation of Position A, B, and C in the image polarizer 430 is based on the multi-game option selection remains the same, such that the polarization functionality and the shifting based on game selection is not changed.

Figure 9:
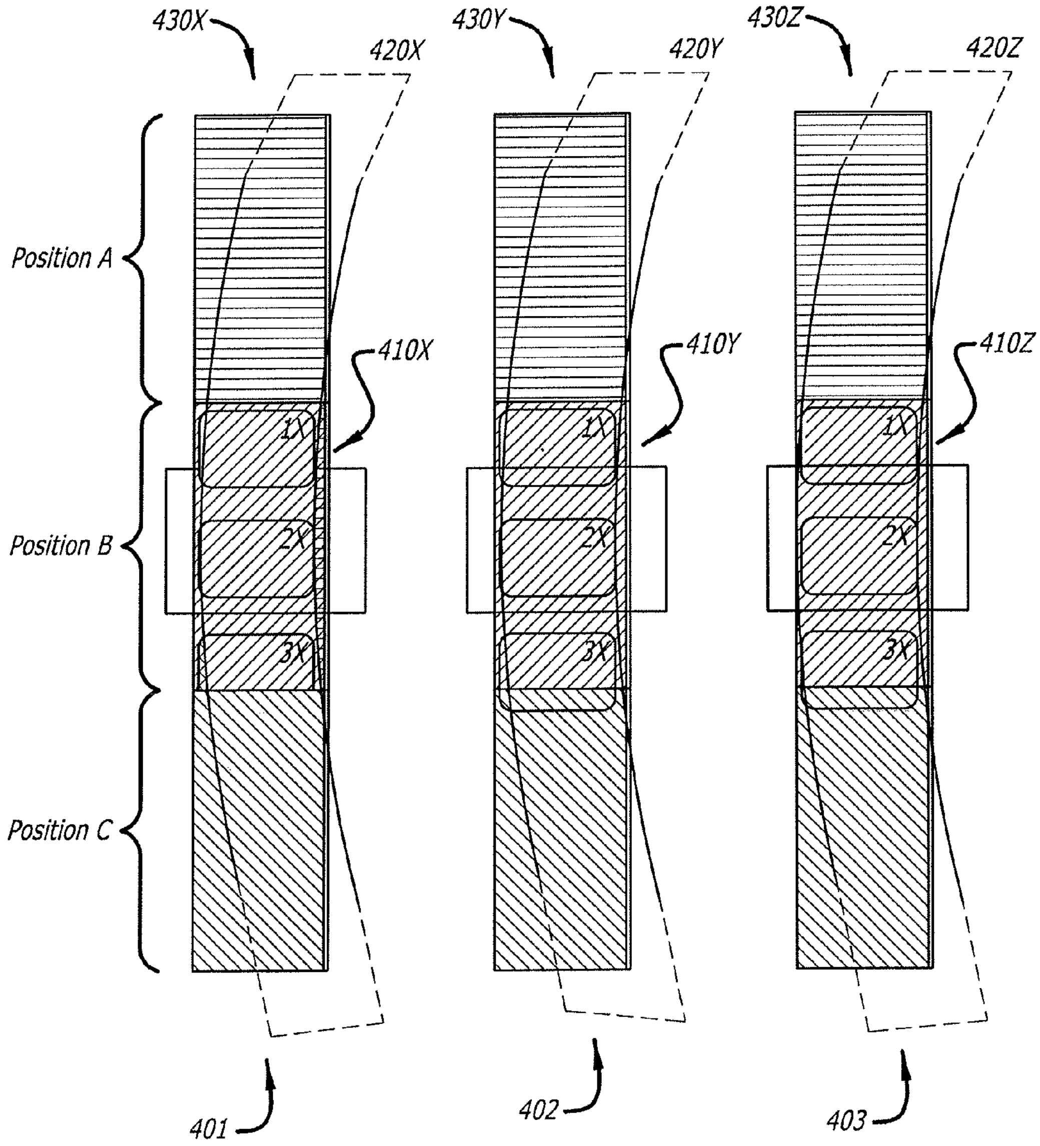
FIG. 9 is a simplified perspective view of the alternative embodiment with uniform back light.

FIG. 9 presents is a simplified perspective view of still another embodiment of a mechanical reel gaming machine 400 with three position image polarizers 430 in which a sample gaming machine has three mechanical reels. Notably, with the alternative embodiment arranging the layer of the back light source 410 first, the image polarizer 430 strip second, and the mechanical reel 420 third, the highlighting effect behind the winning combination symbols in the winning payline is difficult to achieve.

Figure 10:
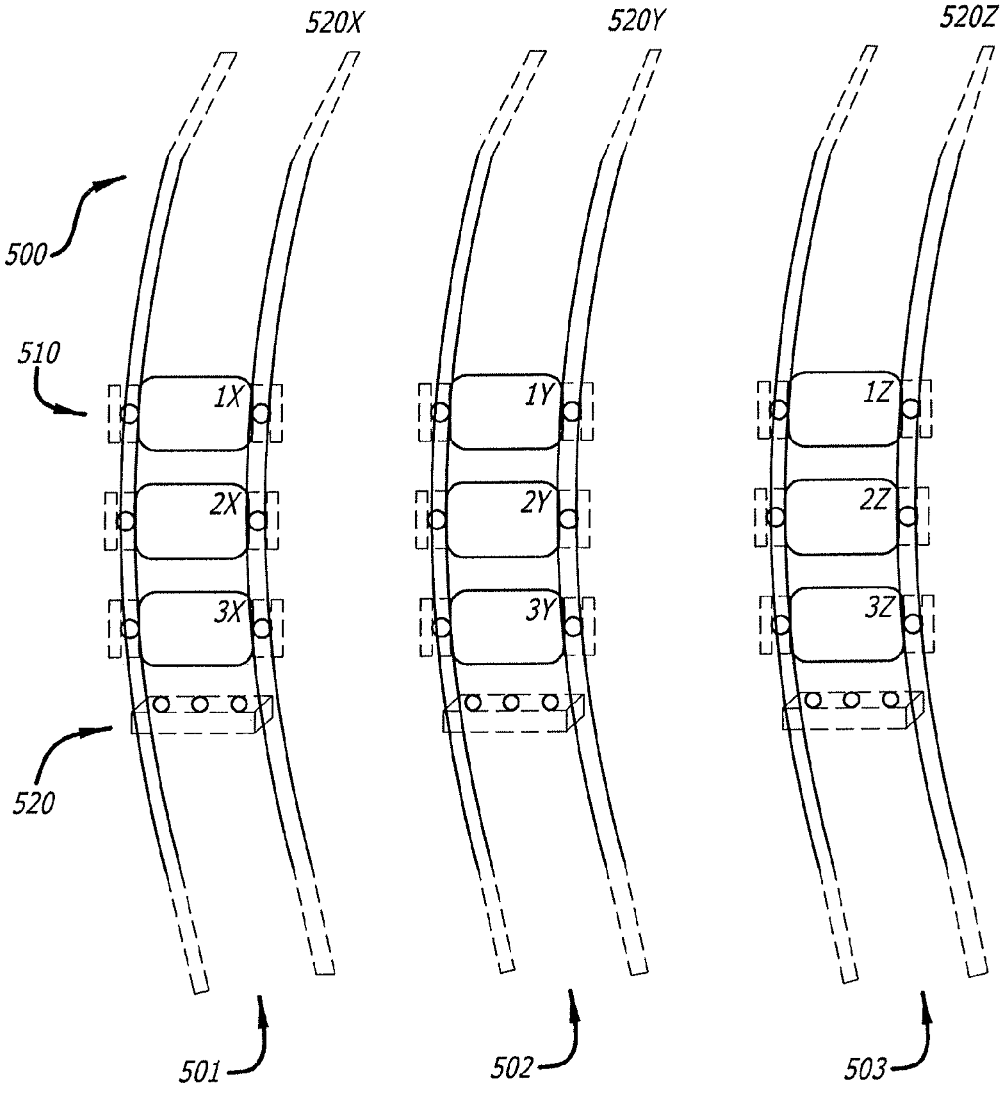
FIG. 10 is a simplified perspective view of a gaming machine for the alternative embodiment displaying how highlighting of the symbols can be achieved.

Referring now to FIG. 10, a simplified perspective view of a mechanical reel gaming machine 500 with three position image polarizers 530 is shown for the alternative embodiment displaying how the symbols are highlighted. Specifically, FIG. 10 is a simplified perspective view of a gaming machine 500 that shows alternate ways to provide highlighting on the mechanical reel symbols, in relation to the alternative embodiment as displayed in FIGS. 5 and 6. The mechanical reels' side frames can hold lighting structures 510 on both sides of the positions 1, 2, and 3. The lighting structures 510 then project light horizontally over the positions. A front lighting structure 520 located in the front on each of the mechanical reel strips 520 utilizes light outlets that can project onto and highlight the light positions 1, 2, and 3.

One of ordinary skill in the art will appreciate that not all gaming machines 10 will have all these components and may have other components in addition to, or in lieu of, those components mentioned here. Furthermore, while these components are viewed and described separately, various components may be integrated into a single unit in some embodiments.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A mechanical reel gaming machine for playing multiple different games that have different symbol images at the symbol positions on each mechanical reel, the gaming machine comprising:

a gaming machine cabinet housing a plurality of mechanical reels, each mechanical reel having a mechanical reel strip attached thereto, wherein a polarized material layer is attached to the exterior of each mechanical reel strip, wherein each symbol position on each mechanical reel contains a composite of multiple overlapping symbol images in the attached polarized material layer, and wherein individual symbols within the composite of overlapping symbol images are visible in different types of polarized light;

a plurality of back light sources for each mechanical reel; and an image polarizer for each back light source, wherein the image polarizers are distinct from the polarized material layer attached to the reel strips, wherein the image polarizers, the back light sources, and the composite of multiple overlapping symbol images at each symbol position produce different symbol images in different orientations of polarized light.

2. The gaming machine of claim 1, wherein the plurality of mechanical reels comprises three reels.

3. The gaming machine of claim 1, wherein the plurality of back light source comprises three back light sources.

4. The gaming machine of claim 1, wherein the back light sources are uniform.

5. The gaming machine of claim 1, wherein the image polarizers have a number of polarized orientations equal to the number of different games available on the gaming machine.

6. The gaming machine of claim 1, wherein the image polarizers have a number of polarized orientations equal to the number of different images in a viewable gaming machine symbol position composite.

7. The gaming machine of claim 1, wherein the back light sources are within the most interior layer, the mechanical reels are within the next layer, and the image polarizers are with the third and outer layer.

8. The gaming machine of claim 1, wherein an appearance of a winning combination with a wildcard symbol causes a polarization effect cycle through and display equivalent symbols of the wildcard symbol.

9. The gaming machine of claim 1, wherein in response to a bonus round commencing, a new bonus feature is initiated with a unique use of polarized lighting effects on certain symbols.

10. A gaming machine as recited in claim 1, wherein the back lights are one uniform light source, the image polarizers are the layer next to their respective back light sources, and the mechanical reels and their attached polarized material layer are the third and most outer layer in the gaming machine.

11. A mechanical reel gaming system for playing multiple different games that have different symbol images at the symbol positions on each mechanical reel, the gaming system comprising:

a gaming machine cabinet housing a plurality of mechanical reels, each mechanical reel having a mechanical reel strip attached thereto, wherein a polarized material layer is attached to the exterior of each mechanical reel strip, and wherein each symbol position on each mechanical reel contains a composite of multiple overlapping symbol images in the attached polarized material layer, and wherein individual symbols within the composite of overlapping symbol images are visible in different types of polarized light;

a plurality of back light sources for each mechanical reel;

an image polarizer for each back light source, wherein the image polarizers are distinct from the polarized material layer attached to the reel strips, wherein the image polarizers, the back light sources, and the composite of multiple overlapping symbol images at each symbol position produce different symbol images in different orientations of polarized light; and a server communicated to the gaming machine by a network.

12. The gaming system of claim 11, wherein the plurality of mechanical reels comprises three reels.

13. The gaming system of claim 11, wherein the plurality of back light source comprises three back light sources.

14. The gaming system of claim 11, wherein the back light sources are uniform.

15. The gaming system of claim 11, wherein the image polarizers have a number of polarized orientations equal to the number of different games available on the gaming machine.

16. The gaming system of claim 11, wherein the image polarizers have a number of polarized orientations equal to the number of different images in a viewable gaming machine symbol position composite.

17. The gaming system of claim 11, wherein the back light sources are within the most interior layer, the mechanical reels are within the next layer, and the image polarizers are with the third and outer layer.

18. The gaming system of claim 11, wherein an appearance of a winning combination with a wildcard symbol causes a polarization effect cycle through and display equivalent symbols of the wildcard symbol.

19. The gaming system of claim 11, wherein in response to a bonus round commencing, a new bonus feature is initiated with a unique use of polarized lighting effects on certain symbols.

20. A gaming system as recited in claim 11, wherein the back lights are one uniform light source, the image polarizers are the layer next to their respective back light sources, and the mechanical reels and their attached polarized material layer are the third and most outer layer in the gaming machine.

* * * * *